July 8, 1969
B. GÄNGER
3,454,804
INSULATION OF BAR TYPE CONDUCTOR COILS
OF HIGH-VOLTAGE STATOR WINDINGS
Filed July 21, 1966
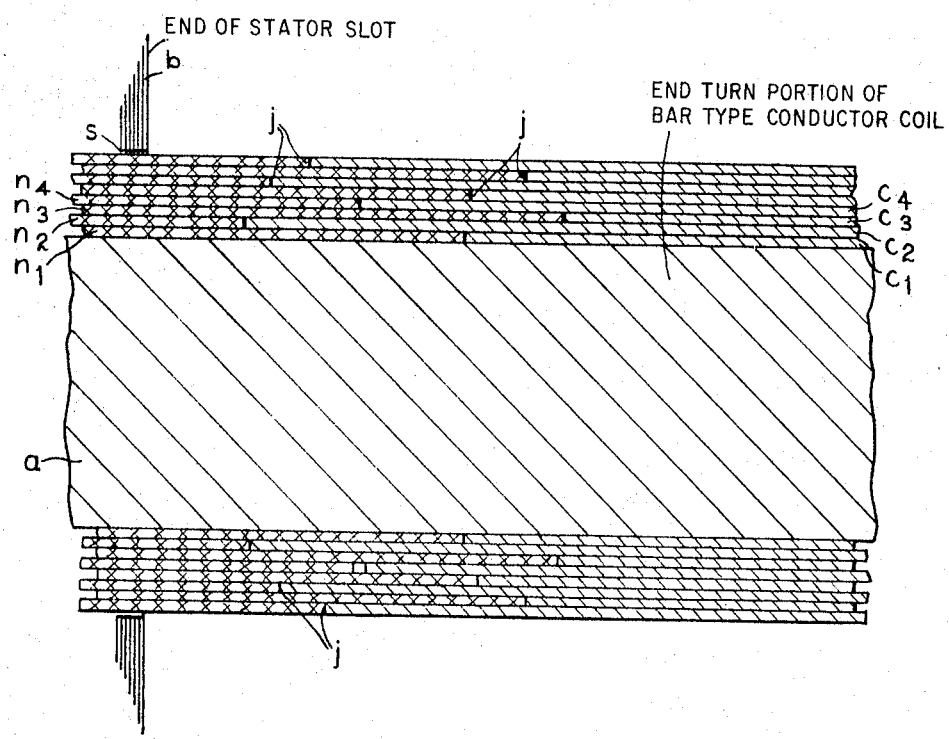
INVENTOR.
Berthold Gänger
BY
Pierce, Scheffler & Parker
Attorneys 3,454,804
INSULATION OF BAR TYPE CONDUCTOR COILS
OF HIGH-VOLTAGE STATOR WINDINGS
Berthold Gänger, Wettingen, Switzerland, assignor to
Aktiengesellschaft Brown, Boveri & Cie, Baden, Switzerland, a joint-stock company
Filed July 21, 1966, Ser. No. 566,886
Claims priority, application Switzerland, July 30, 1965,
10,774/65
Int. Cl. H02k 3/30, 3/46
U.S. Cl. 310—260         1 Claim

ABSTRACT OF THE DISCLOSURE

A bar type conductor coil which forms a part of a high-voltage winding of the stator of an electrical machine is insulated by applying a plurality of superposed layers of band insulation. Each insulating layer is constituted by wound-on band insulations applied separately to the slot and end turn portions of the conductor coil which abut one another in the vicinity of the transition between slot and end turn portions, and the respective points of abutments of the band insulations are staggered longitudinally from layer to layer to thereby effect an interleaving of the slot and end turn portions of the band insulations in adjacent insulating layers.

---

High-voltage stator windings require an accurately dimensioned dense insulation of high dielectric strength for the slot-part of the winding. For the end turns of the coils at both ends of the stator, the requirements as regards the insulation are generally not so severe. Two different methods are known for the production of such insulations.

With one method, the insulation for the slot part and also the end turn consists of numerous overlapping layers of an insulation band which is wound around the slot part and end turns of the conductor in a continuous operation; if desired, the number of layers and thus the thickness of the insulation for the end turns and the slot part can differ from each other. An insulation produced by this method, is termed a uniformly continuously wound insulation.

With the other known method the slot part and end turns are insulated separately, so that different insulating materials can be used in connection with each part. Often the slot part of the conductor is insulated by wrapping a sheet of insulating material of suitable width around it and the insulation covering which is thus formed is subjected to pressure and ironed in the heated state. Only a band insulation can, however, be used for the end turns on account of the bends in the condctor. Such a combined insulation is not uniform and is designated as a discontinuous insulation. In order not to endanger the electrical safety at the point where the slot and end turn insulations abut, it is generally usual to extend the slot insulation for a certain distance beyond the end of the stator core and the band insulation is then wound so as also to cover the conically shaped end of the slot insulation.

The present invention is directed to the type of insulated high-voltage stator windings where a band insulation is used for both the slot part and the end turns and at the point of transition from the insulation of the slot part to that of the end turn a high dielectric strength is obtained. This is achieved according to the invention in that both the slot and end turn band insulations are interleaved so that at the transition point of the insulations there is complete interpenetration. Thus, when the insulation has been applied to the bar or coil there is no longer any actual butt joint between the two insulations and the entire insulation is practically uniform and continuous. There is thus a certain overlapping of the layers of both insulations.

The method of producing the insulation is explained by means of the accompanying drawing, the single figure of which shows in longitudinal section part of a bar conductor for a stator winding. The thickness of the insulation in relation to the dimension of the conductor bar has been exaggerated in the interest of clarity.

In the figure $b$ is the end part of a laminated stator core for which the stator winding that is to be insulated according to the present invention is intended, this end part of the stator core being shown so as to indicate the position of a bar or coil $a$ with respect to the core. The slot in the core which receives the slot part of the conductor bar $a$ is indicated at $s$. Either the slot part or end turn of the copper bar $a$ is first of all wound with a layer of insulating tape or band up to the point of transition between the slot part and end turn. Thus for instance the first layer $n_1$ of the slot insulation is wound on the bar, each successive turn of this layer slightly overlapping the previous one as is usual with band insulations. The first layer $c_1$ of the band insulation is then wound on the end turn portion of the conductor bar or so as to adjoin and abut the end of the first layer $n_1$ on the slot part. After this, the second layer $c_2$ for the end turn is wound on the conductor bar $a$ and then the adjoining slot part insulation layer $n_2$. As is obvious from the drawing, the second layer $c_2$ for the end turn portion of the conductor bar overlaps a portion of the first layer $n_1$ applied to the slot portion of the conductor bar. In a similar manner further layers $n_3$, $n_4$ and the like for the slot part insulation and the corresponding end turn layers $c_3$, $c_4$ and so on are wound alternately around the bar $a$ with the abutting joints $j$ between the slot and end turn portions of adjacent layers in overlapping relation so as to interleave the insulations on the slot and end turn portions until the desired thickness of insulation is obtained, whereby it is only necessary to take care that the transition from the slot insulation layers to the end turn insulation is within a certain range selected for the transition point. It is of course possible to commence winding each new layer of insulation tape always at the same end, that is always to commence with the insulation layer for the slot part or the end turn, instead of commencing alternately with slot part insulation and the end turn insulation as already described.

As shown in the figure, the abutment point of both insulations in each layer can be displaced in the longitudinal direction from layer to layer. The dielectric strength at the transition point from one insulation layer to the adjoining one is thus increased and when bands of different thickness are used for the insulations there is a more uniform transition with the result that any appreciable bulge in the insulation at the transition point is avoided. When insulation band or tape of a different kind and thickness is used for the slot part and end turn of the conductor, an equalisation can be achieved without detrimental effect as regards the electrical strength at the transition point by using a greater number of tape layers on the side where the thinner tape is used and a succession of two or more layers of the same band also at the transition point.

With the interleaving method described it is possible to obtain a close interpenetration of the slot part and end turn insulation at the transition point of both insulations. As a consequence, it is possible to produce a continuous insulation for the slot part and end turns of bar conductors and coils for stator windings even when using different types of insulating tape for each part.

I claim:

1. An insulated bar type conductor coil forming part of a high voltage winding of the stator component of an electrical machine and wherein said coil includes a portion adapted to be inserted in a stator slot and end turn portions projecting beyond said slot, said insulation being applied to said conductor bar in superposed layers, each said insulating layer being constituted by separately wound-on band insulations applied respectively to the slot and end turn portions and abutting one another in the vicinity of the transition from the slot to the end turn portion of the conductor bar, and the respective points of abutments of said band insulations being staggered longitudinally from layer to layer thereby to effect an interleaving of the slot and end turn portions of said band insulations in adjacent insulating layers.

References Cited

UNITED STATES PATENTS 3,330,978   7/1967   Pettit _____ 310—271

WARREN E. RAY, *Primary Examiner.*

R. SKUDY, *Assistant Examiner.*

U.S. Cl. X.R.

174—120